(12) United States Patent
Yaguchi et al.

(10) Patent No.: US 11,993,724 B2
(45) Date of Patent: May 28, 2024

(54) METHOD FOR PRODUCING A MOLDING ARTICLE

(71) Applicant: Hitachi Metals, Ltd., Tokyo (JP)

(72) Inventors: Atsuro Yaguchi, Hitachi (JP); Akinari Nakayama, Hitachinaka (JP)

(73) Assignee: PROTERIAL, LTD., Tokyo (JP)

( * ) Notice: Subject to any disclaimer, the term of this patent is extended or adjusted under 35 U.S.C. 154(b) by 1091 days.

(21) Appl. No.: 16/839,386

(22) Filed: Apr. 3, 2020

(65) Prior Publication Data
US 2020/0248026 A1 Aug. 6, 2020

Related U.S. Application Data

(63) Continuation of application No. 15/498,265, filed on Apr. 26, 2017, now abandoned.

(30) Foreign Application Priority Data

May 13, 2016 (JP) ................... 2016-097107

(51) Int. Cl.
*H01B 13/06* (2006.01)
*C09D 127/18* (2006.01)
(Continued)

(52) U.S. Cl.
CPC ........... *C09D 127/18* (2013.01); *H01B 3/441* (2013.01); *H01B 3/445* (2013.01); *H01B 13/06* (2013.01);
(Continued)

(58) Field of Classification Search
CPC ...... C09D 127/18; H01B 13/06; H01B 3/308; H01B 13/14; Y10T 29/49227; B29C 48/00
See application file for complete search history.

(56) References Cited

U.S. PATENT DOCUMENTS

| 4,770,937 A | 9/1988 | Yagyu et al. |
| 2011/0209895 A1 | 9/2011 | Saito et al. |

(Continued)

FOREIGN PATENT DOCUMENTS

| JP | H 06-076643 A | 3/1994 |
| JP | 2006-123458 | * 11/2004 |

(Continued)

OTHER PUBLICATIONS

United States Office Action dated Oct. 5, 2018 in U.S. Appl. No. 15/498,265.

(Continued)

*Primary Examiner* — Donghai D Nguyen
(74) *Attorney, Agent, or Firm* — MCGINN I.P. LAW GROUP, PLLC.

(57) ABSTRACT

A method for producing a molding article includes preparing an insulated wire including an outermost layer disposed on an outer periphery of a conductor, the outermost layer including a resin composition including a fluorine-containing elastomer. The resin composition includes a tetrafluoroethylene-propylene copolymer and an ethylene-tetrafluoroethylene copolymer as an entire base polymer or a portion of the base polymer at a mass ratio of the tetrafluoroethylene-propylene copolymer to the ethylene-tetrafluoroethylene copolymer in a range of 100:0 to 60:40. The resin composition further includes 5 to 60 parts by mass of calcium carbonate and/or silica as an inorganic filler with respect to 100 parts by mass of the base polymer.

20 Claims, 3 Drawing Sheets (51) Int. Cl.
*H01B 3/44* (2006.01)
*B29C 48/00* (2019.01)
*H01B 3/30* (2006.01)
*H01B 13/14* (2006.01)

(52) U.S. Cl.
CPC ......... *B29C 48/00* (2019.02); *C08L 2205/025* (2013.01); *H01B 3/308* (2013.01); *H01B 13/14* (2013.01); *Y10T 29/49227* (2015.01)

(56) References Cited

U.S. PATENT DOCUMENTS

| | | |
|---|---|---|
| 2014/0182883 A1 | 7/2014 | Sugita et al. |
| 2014/0342155 A1 | 11/2014 | Abe et al. |
| 2014/0377557 A1 | 12/2014 | Nakahashi |
| 2015/0030853 A1 | 1/2015 | Iwasaki et al. |
| 2017/0282469 A1 | 10/2017 | Yamamura et al. |

FOREIGN PATENT DOCUMENTS

| | | |
|---|---|---|
| JP | 2009-43429 A | 2/2009 |
| JP | 2012-028123 A | 2/2012 |
| JP | 2014-141650 A | 8/2014 |

OTHER PUBLICATIONS

United States Office Action dated Apr. 11, 2019 in U.S. Appl. No. 15/498,265.
United States Office Action dated Jan. 15, 2020 in U.S. Appl. No. 15/498,265.
English Machine Translation: Sasaki et al. (JP 2009-043429).

\* cited by examiner

METHOD FOR PRODUCING A MOLDING ARTICLE

The present application is a Continuation Application of U.S. patent application Ser. No. 15/498,265 filed on Apr. 26, 2017, which is based on and claims priority from Japanese Patent Application No. 2016-097107 filed on May 13, 2016, the entire contents of which are incorporated herein by reference.

BACKGROUND OF THE INVENTION

1. Field of the Invention

The invention relates to an insulated wire, a cable and a molded article using the insulated wire and/or the cable.

2. Description of the Related Art

When an electric wire or a cable is connected to a device/component such as sensor or an electrode terminal, the connected portion and the vicinity thereof are generally covered with a molded resin for protection.

Since devices/components such as sensor are used in automobiles, robots and electronic devices, etc., which are required to have high reliability, airtightness between the molded resin and the electric wire or cable is one of very important properties. For this reason, it is very important that a molding material and a wire/cable covering material which exhibit excellent adhesion are combined (see JP-A-2012-028123 and JP-A-2014-141650).

Major molding materials used for such purpose are polyamide resins and polyurethane resins, etc.

On the other hand, electric wires and cables are increasingly required to have higher heat resistance. Among electric wires/cables currently used, electric wires covered with a fluorine-containing elastomer composition are particularly excellent in heat resistance (see JP-A-H06-076643).

SUMMARY OF THE INVENTION

Due to the weak adhesion between the fluorine-containing elastomer composition and the molding material such as polyamide resin or polyurethane resin, it may be made difficult to ensure a desired airtightness. Especially where the cross-linked fluorine-containing elastomer composition is used, since it is hard to expect an adhesion generating effect such as an anchor effect caused by interdiffusion of materials due to heat during molding, the desired airtightness may not be obtained.

To address such problem, a heat-shrinkable tube can be provided between the electric wire/cable and the molding material to obtain the airtightness. However, this causes an increase in the number of components. Thus, the downsizing of the molded article and the cost reduction may be thereby impeded.

It is an object of the invention to provide an electric wire and a cable that are excellent in adhesion to the molding material while using the fluorine-containing elastomer as the covering material, as well as a molded article using the electric wire and/or the cable.

(1) According to an embodiment of the invention, an insulated wire comprises an outermost layer comprising a resin composition comprising a fluorine-containing elastomer,
wherein a ratio of C=O bond to C—C bond (C=O/C—C) on a surface of the outermost layer is not less than 0.5,
wherein the resin composition further comprises a tetrafluoroethylene-propylene copolymer and an ethylene-tetrafluoroethylene copolymer as the entire base polymer or a portion of the base polymer at a mass ratio ((of the tetrafluoroethylene-propylene copolymer) to (the ethylene-tetrafluoroethylene copolymer)) in a range of 100:0 to 60:40,
wherein the resin composition further comprises 5 to 60 parts by mass of calcium carbonate and/or silica as an inorganic filler with respect to 100 parts by mass of the base polymer, and
wherein the resin composition is cross-linked.

(2) According to another embodiment of the invention, the insulated wire of the embodiment (1) may be configured such that the outermost layer is treated by atmospheric-pressure plasma.

(3) According to another embodiment of the invention, a molded article comprises:
the insulated wire of the embodiment (1) or (2); and
a molding material on an outer periphery of the insulated wire.

(4) According to another embodiment of the invention, a cable comprises an outermost layer comprising a resin composition comprising a fluorine-containing elastomer,
wherein a ratio of C=O bond to C—C bond (C=O/C—C) on a surface of the outermost layer is not less than 0.5,
wherein the resin composition further comprises a tetrafluoroethylene-propylene copolymer and an ethylene-tetrafluoroethylene copolymer as the entire base polymer or a portion of the base polymer at a mass ratio ((of the tetrafluoroethylene-propylene copolymer) to (the ethylene-tetrafluoroethylene copolymer)) in a range of 100:0 to 60:40,
wherein the resin composition further comprises 5 to 60 parts by mass of calcium carbonate and/or silica as an inorganic filler with respect to 100 parts by mass of the base polymer, and
wherein the resin composition is cross-linked.

(5) According to another embodiment of the invention, the cable of the embodiment (4) may be configured such that the outermost layer is treated by atmospheric-pressure plasma.

(6) According to another embodiment of the invention, a molded article comprises:
the cable of embodiment (4) or (5); and
a molding material on an outer periphery of the cable.

Effects of the Invention

According to an embodiment of the invention, an electric wire and a cable can be provided that are excellent in adhesion to the molding material while using the fluorine-containing elastomer as the covering material, as well as a molded article using the electric wire and/or the cable.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

Insulated Wire

An insulated wire in the embodiment of the invention is provided with the outermost layer formed of a resin composition containing fluorine-containing elastomer, and a ratio of C=O bond (hereinafter, also referred to as "carbonyl group") to C—C bond (C=O/C—C) on a surface of the outermost layer is not less than 0.5.

The embodiment of the invention will be described in detail below in conjunction with the drawings.

Figure 1:
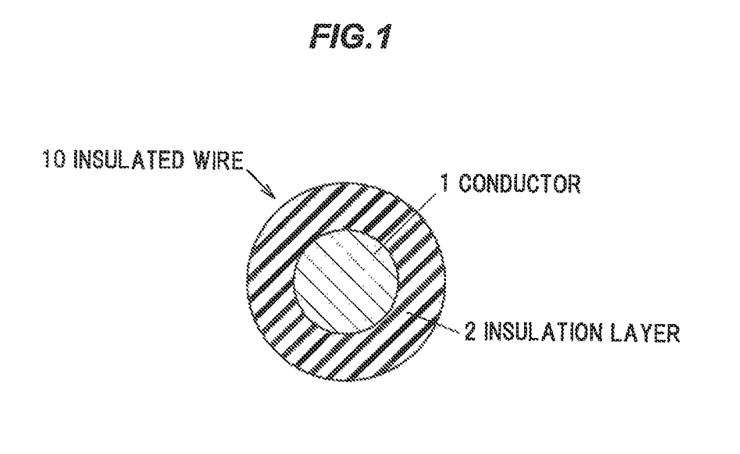
FIG. 1 is a cross sectioned view showing an example of an insulated wire in an embodiment of the present invention.

FIG. 1 is a cross sectional view showing an example of an insulated wire in the embodiment of the invention.

An insulated wire 10 in the embodiment of the invention shown in FIG. 1 is provided with a conductor 1, and an insulation layer 2 as the outermost layer covering the conductor 1 and formed of a resin composition containing fluorine-containing elastomer.

The conductor 1 can be formed of a known material, such as copper, soft copper, silver or aluminum, of which surface may be plated with tin, nickel, silver or gold, etc. The conductor 1 is not limited to a solid wire as shown in FIG. 1 and may be formed by twisting plural strands.

The resin composition containing fluorine-containing elastomer, which constitutes the insulation layer 2 as the outermost layer, contains a tetrafluoroethylene-propylene copolymer (TFEP) as a base polymer. The tetrafluoroethylene-propylene copolymer is exemplarily used in combination with an ethylene-tetrafluoroethylene copolymer (ETFE). An appropriate polymer(s) other than TFEP and ETFE may be contained in the base polymer. The content of the other polymer is exemplarily not more than 15 mass % of the base polymer, more exemplarily not more than 10 mass %, further exemplarily not more than 5 mass %.

Tetrafluoroethylene-Propylene Copolymer

The tetrafluoroethylene-propylene copolymer when treated with atmospheric-pressure plasma exerts a large modifying effect and gives adhesiveness to various molding materials. The tetrafluoroethylene-propylene copolymer used here either may or may not contain a bond in a polymer main chain. Two or more types of tetrafluoroethylene-propylene copolymers may be used together.

The tetrafluoroethylene-propylene copolymer may be further copolymerized with a component copolymerizable with its bases, tetrafluoroethylene and propylene. Examples of such component include isobutylene, acrylic acid and chloroethyl vinyl ether, etc., but it is not limited thereto.

In view of processability, the tetrafluoroethylene-propylene copolymer used in the present embodiment exemplarily has a Mooney viscosity of not more than 200 ML, more exemplarily not more than 100 ML, at 100° C.

Ethylene-Tetrafluoroethylene Copolymer

The ethylene-tetrafluoroethylene copolymer, which has a smaller modifying effect when treated with atmospheric-pressure plasma than the tetrafluoroethylene-propylene copolymer, is used to complement the poor properties of the tetrafluoroethylene-propylene copolymer such as toughness (tensile strength, etc.). Two or more types of ethylene-tetrafluoroethylene copolymers may be used together.

In view of suppressing self-heating at the time of extrusion and also suppressing foaming, the ethylene-tetrafluoroethylene copolymer exemplarily has a melt flow rate (297° C., 49N) of not less than 10 (g/10 min) and a melting point of not more than 240° C.

The ethylene-tetrafluoroethylene copolymer may contains a third component other than its bases, ethylene and tetrafluoroethylene. The third component may be, e.g., fluoroolefin, but it is not limited thereto.

A mixing mass ratio of the tetrafluoroethylene-propylene copolymer to the ethylene-tetrafluoroethylene copolymer (the tetrafluoroethylene-propylene copolymer, the ethylene-tetrafluoroethylene copolymer) is in the range of 100:0 to 60:40, exemplarily 95:5 to 65:35, more exemplarily 90:10 to 70:30. When the amount of the ethylene-tetrafluoroethylene copolymer is too large, adhesion is likely to be insufficient and the desired airtightness is thus less likely to be obtained. Here, the tetrafluoroethylene-propylene copolymer, the ethylene-tetrafluoroethylene copolymer=100:0 means that the tetrafluoroethylene-propylene copolymer is contained and the ethylene-tetrafluoroethylene copolymer is not contained.

Inorganic Filler

The resin composition containing fluorine-containing elastomer contains calcium carbonate and/or silica as an inorganic filler. Fillers other than calcium carbonate and silica tend to be less heat resistant, even though the detailed reason is not known. Other inorganic fillers such as talc, clay, magnesium hydroxide or aluminum hydroxide may be added within the range where heat resistance is not impaired.

The inorganic filler used in the embodiment of the invention exemplarily has an average particle size in the range of 0.1 to 10 μm as measured by a laser diffraction particle size distribution analyzer. Heat resistance may not be sufficient when the average particle size is less than 0.1 μm, while tensile strength may not be sufficient when the average particle size is more than 10 μm.

The filler content of the inorganic filler used in the embodiment of the invention is not less than 5 parts by mass and not more than 60 parts by mass, exemplarily not less than 10 parts by mass and not more than 40 parts by mass, more exemplarily not less than 10 parts by mass and not more than 30 parts by mass, with respect to 100 parts by mass of the base polymer. When the filler content is less than 5 parts by mass, the outer appearance after extrusion may be rough. When the filler content is more than 60 parts by mass, heat resistance may not be sufficient.

Other Additives

A cross-linking agent, a crosslinking aid, a filler, a stabilizer, an antioxidant, a lubricant, a flame retardant and a plasticizer, etc., may be appropriately added to the resin composition containing fluorine-containing elastomer, in addition to the inorganic filler, within the range where the object of the invention can be achieved.

In the embodiment of the invention, the resin composition containing fluorine-containing elastomer constituting the insulation layer 2 is cross-linked. Electron beam irradiation cross-linking is exemplary as the cross-linking method.

Surface Modification

The resin composition containing fluorine-containing elastomer needs to have a carbonyl group on a material surface as an adhesive interface so as to be capable of adhering to a molding material formed of nylon. When the carbonyl group is contained, adhesion is produced due to hydrogen bonding between the carbonyl group in the resin composition containing fluorine-containing elastomer and an amide group in the molding material. Atmospheric-pressure plasma treatment, adhesive coating, and addition of a polymer having a carbonyl group (maleic acid-modified polyethylene, etc.) to the resin composition containing fluorine-containing elastomer, etc., are used to introduce the carbonyl group. Of those, atmospheric-pressure plasma treatment is exemplary due to capability of in-line treatment, excellent productivity, and a less adverse effect on other characteristics.

In the embodiment of the invention, a ratio of C=O bond to C—C bond (C=O/C—C) on a surface of the insulation layer 2 as the outermost layer is not less than 0.5, exemplarily not less than 0.6, more exemplarily not less than 0.8, further exemplarily not less than 1.0.

One of the methods of adjusting the ratio of C=O bond to C—C bond (C=O/C—C) on the surface to fall within such range is, e.g., atmospheric-pressure plasma treatment of the insulation layer 2. In this case, the mixing mass ratio of the tetrafluoroethylene-propylene copolymer to the ethylene-tetrafluoroethylene copolymer is exemplarily in the previously-described range.

For example, the atmospheric-pressure plasma treatment is performed under the following conditions: an equipment used is an atmospheric-pressure plasma jet system (a commercially available system manufactured by, e.g., Nihon Plasmatreat Inc.), the treatment rate is 0.1 to 5 m/min, and a distance from a nozzle hole to the insulated wire is 3 to 7 mm. The type of gas used to generate atmospheric-pressure plasma can be nitrogen or dry air, etc. When the distance from the nozzle hole to the insulated wire is more than 7 mm, sufficient airtightness may not be achieved.

Other methods of adjusting the ratio of C=O bond to C—C bond (C=O/C—C) on the surface to fall within the above-described range are, e.g., a method in which the above-mentioned fluorine-containing elastomer (TFEP, ETFE) is mixed with a maleic acid-modified polymer or an epoxy-modified polymer (a polymer with a modifying functional group containing a C=O group), in detail, the above-mentioned fluorine-containing elastomer is mixed with a maleic acid-modified ethylene propylene diene (EPDM) rubber or an ethylene-glycidyl methacrylate (EGMA), and a method in which an acrylic acid, etc., is grafted onto a polymer side chain by reaction.

In the present embodiment, the insulation layer 2 may be a single layer or may have a multilayer structure. A separator or a braid, etc., may be further provided, if required.

Cable

A cable in the embodiment of the invention is provided with the outermost layer formed of a resin composition containing fluorine-containing elastomer, and a ratio of C=O bond to C—C bond (C=O/C—C) on a surface of the outermost layer is not less than 0.5.

The embodiment of the invention will be described in detail below in conjunction with the drawings.

Figure 2:
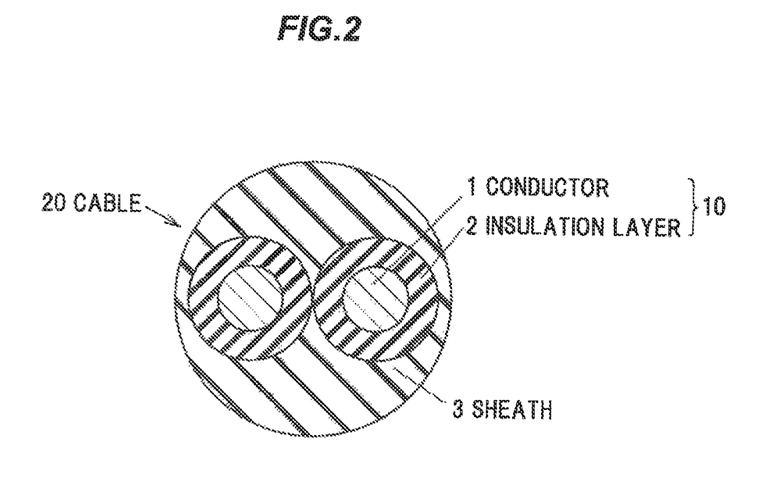
FIG. 2 is a cross sectional view showing an example of a cable in the embodiment of the invention.

FIG. 2 is a cross sectional view showing an example of a cable in the embodiment of the invention.

A cable 20 in the embodiment of the invention shown in FIG. 2 is provided with a two-core twisted wire formed by twisting two insulated wires 10 each formed by covering the conductor 1 with the insulation layer 2, and a sheath 3 as the outermost layer provided therearound by extrusion coating and formed of a resin composition containing fluorine-containing elastomer. A single-core may be provided using one insulated wire 10, or a multi-core twisted wire other than two-core may be provided using plural insulated wires 10. In addition, although the insulated wires 10 in the embodiment of the invention are used here, other insulated wires may be used.

The sheath 3 is formed of the above-described resin composition containing fluorine-containing elastomer used to form the insulated wire in the embodiment of the invention.

In the embodiment of the invention, the resin composition containing fluorine-containing elastomer constituting the sheath 3 is cross-linked. Electron beam irradiation cross-linking is exemplary as the cross-linking method.

In the embodiment of the invention, a ratio of C=O bond to C—C bond (C=O/C—C) on a surface of the sheath 3 as the outermost layer is not less than 0.5, exemplarily not less than 0.6, more exemplarily not less than 0.8, further exemplarily not less than 1.0.

One of the methods of adjusting the ratio of C=O bond to C—C bond (C=O/C—C) on the surface to fall within such range is, e.g., atmospheric-pressure plasma treatment of the sheath 3. In this case, the mixing mass ratio of the tetrafluoroethylene-propylene copolymer to the ethylene-tetrafluoroethylene copolymer is exemplarily in the previously-described range. The other methods are as previously described.

In the present embodiment, the sheath 3 may be a single layer or may have a multilayer structure. A separator, a braid or a shield tape formed of a metal foil, etc., may be further provided, if required.

Molded Article

Next, a molded article in the embodiment of the invention will be described.

Figure 3:
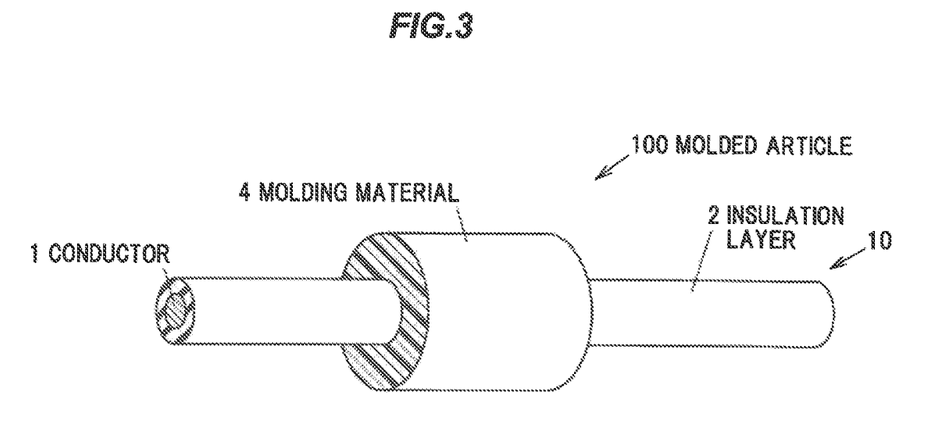
FIG. 3 is a cross sectional view showing an example of a molded article (using the insulated wire of FIG. 1) in the embodiment of the invention.
Figure 4:
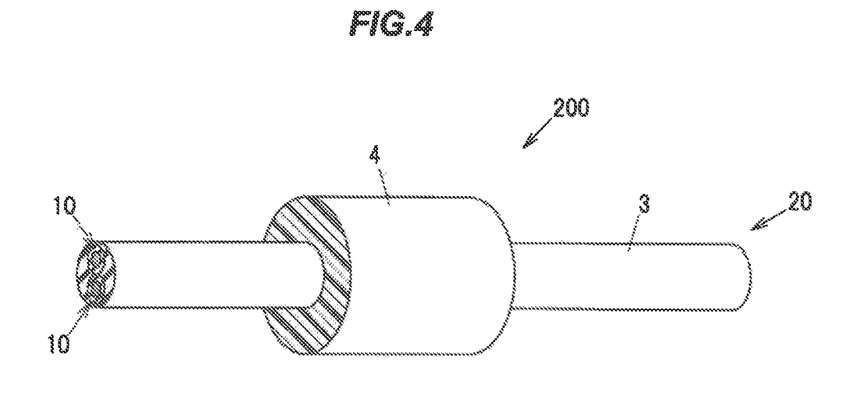
FIG. 4 is a cross sectional view showing another example of the molded article (using the cable of FIG. 2) in the embodiment of the invention.

FIG. 3 is a cross sectional view showing an example of a molded article (using the insulated wire of FIG. 1) in the embodiment of the invention, and FIG. 4 is a cross sectional view showing another example of a molded article (using the cable of FIG. 2) in the embodiment of the invention.

A molded article 100 in the embodiment of the invention is provided with the insulated wire 10 in the embodiment of the invention and a molding material 4 provided on the outer periphery of the insulated wire 10.

Meanwhile, a molded article 200 in the embodiment of the invention is provided with the cable 20 in the embodiment of the invention and the molding material 4 provided on on the outer periphery of the cable 20.

As the molding material 4, it is possible to use, e.g., a polyamide resin or a polyurethane resin, etc.

The method of providing the molding material 4 on the outer periphery of the insulated wire 10 and the cable 20 is not specifically limited and may be heat fusion.

EXAMPLES

The invention will be described in more detail below based on Examples. However, the invention is not limited thereto.

Preparation of Compound

Example 1 and Comparative Example 3

Blending materials are as shown in Table 1, and products used are as shown in Table 2. Each resin composition containing fluorine-containing elastomer was made as follows.

The materials other than the peroxide were introduced into a kneader maintained at 80° C., and then melted and kneaded while increasing the temperature to 160° C. Then, the obtained mixture was introduced into a short-screw extruder, extruded into a strand shape, and molded into pellets through a pelletizer. The pellets and the peroxide were introduced into a blender maintained at 40° C. and stirred so that the pellets were impregnated with the peroxide, thereby obtaining a compound of resin composition containing fluorine-containing elastomer.

Examples 2 to 6 and Comparative Examples 1 and 2

Proportions of materials are as shown in Table 1, and the materials used are as shown in Table 2. Each resin composition containing fluorine-containing elastomer was made as follows.

The materials were introduced into a kneader maintained at 160° C., and then melted and kneaded while increasing the temperature to 250° C. Then, the obtained mixture was introduced into a short-screw extruder, extruded into a strand shape, and molded into pellets through a pelletizer, thereby obtaining a compound of resin composition containing fluorine-containing elastomer.

Manufacturing of Insulated Wire

Example 1 and Comparative Example 3

Using an extruder having an 80-mm-diameter cylinder, the resin composition containing fluorine-containing elastomer was extruded to cover a copper conductor having a cross sectional area of 0.5 mm$^2$ so that the outer diameter was 1.7 mm. The temperature of the extruder during the extrusion was set to 95° C. for all of the cylinder, the head and the die. The wire after the extrusion was directly heat-treated with steam at a steam pressure of 1.7 MPa for 2 minutes, thereby obtaining the cross-linked insulated wire of each of Example and Comparative Example.

Examples 2 to 6 and Comparative Examples 1 and 2

Using an extruder having an 80-mm-diameter cylinder, the resin composition containing fluorine-containing elastomer was extruded to cover a copper conductor having a cross sectional area of 0.5 mm$^2$ so that the outer diameter was 1.7 mm. The temperature of the extruder during the extrusion was set to 240° C. for all of the cylinder; the head and the die. The wire after the extrusion was cross-linked by exposure to an electron beam of 150 kGy, thereby obtaining the cross-linked insulated wire of each of Examples and Comparative Examples.

Atmospheric-Pressure Plasma Treatment

The insulated wires were treated with plasma using an atmospheric-pressure plasma jet system (manufactured by Nihon Plasmatreat Inc.). The treatment rate was 0.5 m/min, a diameter of nozzle hole was 20 mm, a distance from the nozzle hole to the insulated wire was 3 mm, the beam width was 20 mm, and the gas used was nitrogen.

Manufacturing of Molded Article

A polyamide resin containing glass filler (Zytel FE5382, manufactured by DuPont) was molded by injection molding around the obtained insulated wires as shown in FIG. 3. For the plasma-treated insulated wires, the resin was molded around the plasma-treated portion.

Measurement and Evaluation

Various measurements and evaluations were conducted for the resin compositions containing fluorine-containing elastomer, the insulated wires and the molded articles by the following methods. The results are shown in Table 1.

1. Peel Strength

Making of Test Pieces

Making of Sheet of Resin composition containing fluorine-containing elastomer: Each of the obtained compounds was molded into a sheet shape (120 mm×100 mm×1 mm) by a pressing machine. The molding in Example 1 and Comparative Example 3 was performed at an applied pressure of 10 MPa and a temperature of 190° C. for 10 minutes, and the molding in Examples 2 to 6 and Comparative Examples 1 and 2 was performed at an applied pressure of 10 MPa and a temperature of 250° C. for 3 minutes. In Examples 2 to 6 and Comparative Examples 1 and 2, the sheets of the resin composition containing fluorine-containing elastomers were additionally exposed to an electron beam of 150 kGy.

Making of Sheet of Molding material: A polyamide resin containing glass filler (Zytel FE5382, manufactured by DuPont) was molded into a sheet shape (120 mm×100 mm×1 mm) by a pressing machine. If the sample is needed the atmospheric pressure plasma treatment, the sample should be treated in advance. The molding was performed at an applied pressure of 10 MPa and a temperature of 250° C. for 3 minutes.

Making of Bonded sheet: The sheet of resin composition containing fluorine-containing elastomer and the sheet of molding material were stacked and bonded by a pressing machine at an applied pressure of 10 MPa and a temperature of 250° C. for 3 minutes.

Peel Test

A 180° peel test was conducted in accordance with JIS K 6256, and peel strength of 1 cm was measured.

2. Leak Test

Test Method

Figure 5:
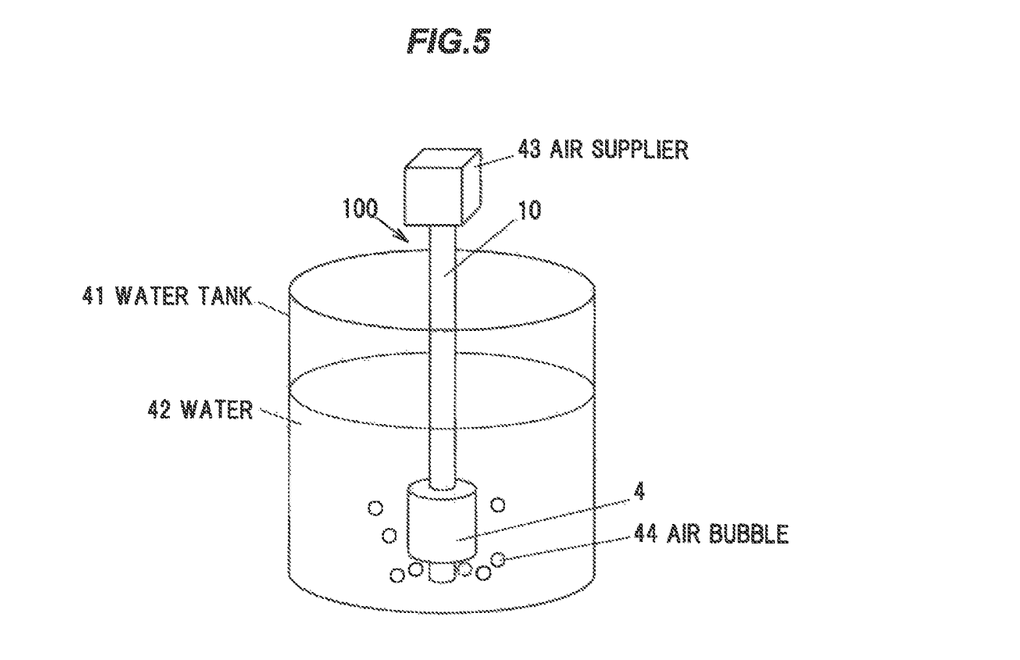
FIG. 5 is a schematic diagram illustrating a test apparatus for leak test between the insulated wire and a molding material of the molded articles in Examples and Comparative Examples.

Each sample was placed in a water tank 41 so that the molding material 4 was immersed in water 42 as shown in FIG. 5, and compressed air was sent from an air supplier 43 to an end of the insulated wire 10 at 50 kPa for 30 seconds.

The samples not producing air bubbles 44 from between the molding material 4 and the insulated wire 10 during air supply were regarded as Pass.

Evaluation Method

A heat shock test was conducted on the samples at −40° C. for 30 minutes and 125° C. for 30 minutes, and the acceptance rate (the number of tested samples: 10) was evaluated after 0 cycle, 500 cycles, 1000 cycles, 2000 cycles, 3000 cycles, 4000 cycles and 5000 cycles. The samples which achieved the acceptance rate of 100% even after 2000 cycles or more were judged as having sufficient airtightness.

3. Tensile Test

The copper conductors were pulled out of the manufactured insulated wires and tubular samples were obtained. Then, tensile strength and tensile elongation of each sample were measured. The tensile test was conducted at a tensile rate of 200 min/min in accordance with UL758. Not less than 10.3 MPa of tensile strength and not less than 125% of elongation were respectively regarded as Pass.

4. Heat Aging Test

After tubular samples obtained by pulling out the copper conductors from the manufactured insulated wires were kept at 232° C. for 168 hours, the tensile test was conducted in the same manner as "3. Tensile test". Tensile strength and tensile elongation of each sample were measured, and tensile strength retention and tensile elongation retention relative to the initial values (the values measured in "3. Tensile test") were calculated. Not less than 95% of tensile strength retention and not less than 80% of tensile elongation retention were respectively regarded as Pass.

5. Surface Analysis

The surface state of the manufactured insulated wires was analyzed by X-ray photoemission spectroscopy. AXIS-HS manufactured by Shimadzu/KRATOS was used as an analyzer. The ratio of C=O bond amount to C—C bond amount (C=O/C—C) was obtained by waveform separation of narrow scan spectrum of carbon (C) atom.

TABLE 1

| | | | | | | | Unit of blending amount: parts by mass | | |
|---|---|---|---|---|---|---|---|---|---|
| | Ex 1 | Ex 2 | Ex 3 | Ex 4 | Ex 5 | Ex 6 | Comp Ex 1 | Comp Ex 2 | Comp Ex 3 |
| TFEP A | 100 | 0 | 0 | 0 | 0 | 0 | 0 | 0 | 70 |
| TFEP B | 0 | 100 | 100 | 85 | 70 | 60 | 30 | 70 | 0 |
| ETFE C | 0 | 0 | 0 | 15 | 30 | 40 | 70 | 30 | 0 |
| MAH-EBA D | 0 | 0 | 0 | 0 | 0 | 0 | 0 | 0 | 30 |
| Peroxide E | 2 | 0 | 0 | 0 | 0 | 0 | 0 | 0 | 2 |
| Crosslinking aid F | 4 | 1 | 1 | 1 | 1 | 1 | 1 | 1 | 4 |
| Calcium carbonate G | 0 | 0 | 20 | 20 | 20 | 20 | 20 | 20 | 0 |
| Silica H | 20 | 20 | 0 | 0 | 0 | 0 | 0 | 0 | 20 |
| Lubricant I | 0.5 | 0.5 | 0.5 | 0.5 | 0.5 | 0.5 | 0.5 | 0.5 | 0.5 |
| Atmospheric-pressure plasma treatment | treated | treated | treated | treated | treated | treated | treated | not treated | not treated |
| 1. Peel strength (N/cm) | 19 | 23 | 50< (MF) | 50< (MF) | 50< (MF) | 50< (MF) | 50< (MF) | 3 | 9 |
| 2. Leak test acceptance rate (%) 0 heat cycles | 100 | 100 | 100 | 100 | 100 | 100 | 100 | 70 | 100 |
| 500 heat cycles | 100 | 100 | 100 | 100 | 100 | 100 | 100 | 30 | 100 |
| 1000 heat cycles | 100 | 100 | 100 | 100 | 100 | 100 | 70 | 0 | 100 |
| 2000 heat cycles | 100 | 100 | 100 | 100 | 100 | 90 | 60 | 0 | 90 |
| 3000 heat cycles | 80 | 90 | 100 | 100 | 100 | 70 | 20 | 0 | 60 |
| 4000 heat cycles | 60 | 60 | 100 | 100 | 100 | 50 | 20 | 0 | 50 |
| 5000 heat cycles | 30 | 40 | 100 | 100 | 90 | 10 | 0 | 0 | 0 |
| 3. Initial strength (MPa) | 13.9 | 14.1 | 11.8 | 12.6 | 14.1 | 16.2 | 19.5 | 14.0 | 12.1 |
| 3. Initial elongation (%) | 250 | 270 | 310 | 290 | 260 | 220 | 160 | 260 | 200 |
| 4. Strength retention after heat aging (%) | 103 | 110 | 105 | 108 | 108 | 109 | 107 | 110 | 132 |
| 4. Elongation retention after heat aging (%) | 83 | 84 | 91 | 88 | 87 | 82 | 81 | 88 | 58 |
| 5. C=O/C—C ratio | 1.39 | 1.52 | 1.58 | 1.09 | 0.83 | 0.68 | 0.39 | 0.04 | 0.34 |

Ex: Example,
Comp Ex: Comparative Example,
MF: material fracture

TABLE 2

| | |
|---|---|
| Tetrafluoroethylene-propylene copolymer (TFEP) A | AFLAS 150E, manufactured by Asahi Glass Co., Ltd. Mooney viscosity (100° C., $ML_{1+10}$; 60) |
| Tetrafluoroethylene-propylene copolymer (TFEP) B | AFLAS 150CS, manufactured by Asahi Glass Co., Ltd. Mooney viscosity (100° C., $ML_{1+10}$; 140) |
| Ethylene-tetrafluoroethylene copolymer (ETFE) C | Fluon LM-730AP, manufactured by Asahi Glass Co., Ltd. MFR: 20 to 30 g/10 min, Melting point: 225° C. |
| Ethylene butyl acrylate maleic anhydride copolymer (MAH-EBA) D | LOTADER 4210, manufactured by Arkema (Melting point: 105° C., MFR: 9 g/10 min, Maleic anhydride content: 3.6%) |
| Peroxide E | Perbutyl P, manufactured by NOF Corporation |
| Crosslinking aid F | TAIC (triallyl isocyanurate), manufactured by Nippon Kasei Chemical Co., Ltd |
| Calcium carbonate G | Vigot 10, manufactured by Shiraishi Calcium Kaisha, Ltd. |

TABLE 2-continued

| | |
|---|---|
| Silica H | Aerosil R972, manufactured by Nippon Aerosil Co., Ltd. |
| Lubricant I | Slipax O (diylbisoleamide), manufactured by Nippon Kasei Chemical Co., Ltd |

In Examples 1 to 6 which were manufactured according to the ranges specified in the invention, all of the samples passed the evaluations of leak test between the insulated wire and the molding material and heat resistance.

In Comparative Example 1, since carbonyl group formation was not sufficient, the sample failed the evaluation of leak test.

In Comparative Example 2, since the plasma treatment was not performed and carbonyl group formation was not sufficient, the sample failed the evaluation of leak test.

In Comparative Example 3, since the plasma treatment was not performed and carbonyl group formation was not sufficient even though a resin having the carbonyl group was mixed, the sample failed the evaluation of leak test. Heat resistance also decreased.

The invention is not intended to be limited to the embodiment and Examples, and the various kinds of modifications can be implemented.

What is claimed is:

1. A method for producing a molding article, the method comprising:
    preparing an insulated wire comprising an outermost layer disposed on an outer periphery of a conductor, the outermost layer comprising a resin composition comprising a fluorine-containing elastomer,
    wherein the resin composition comprises a tetrafluoroethylene-propylene copolymer and an ethylene-tetrafluoroethylene copolymer as an entire base polymer or a portion of the base polymer at a mass ratio of the tetrafluoroethylene-propylene copolymer to the ethylene-tetrafluoroethylene copolymer in a range of 90:10 to 70:30, and
    wherein the resin composition further comprises 5 to 60 parts by mass of calcium carbonate as an inorganic filler with respect to 100 parts by mass of the base polymer;
    performing an atmospheric-pressure plasma treatment to the outermost layer by using an atmospheric-pressure plasma jet system for a ratio of a C=O bond to a C—C bond (C=O/C—C) on a surface of the outermost layer being not less than 0.5 under a condition that a treatment rate is 0.1 m/min to 5 m/min and a distance from a nozzle hole to the insulated wire is 3 mm to 7 min; and
    forming a molding material comprising a polyamide resin or a polyurethane resin on an outer periphery of the insulated wire.

2. The method according to claim 1, wherein the ratio of the C=O bond to the C—C bond (C=O/C—C) on the surface of the outermost layer is not less than 0.6.

3. The method according to claim 1, wherein the ratio of the C=O bond to the C—C bond (C=O/C—C) on the surface of the outermost layer is not less than 0.8.

4. The method according to claim 1, wherein the ratio of the C=O bond to the C—C bond (C=O/C—C) on the surface of the outermost layer is not less than 1.0.

5. The method according to claim 1, wherein the resin composition comprises 5 to 60 parts by mass of the calcium carbonate and silica as the inorganic filler with respect to 100 parts by mass of the base polymer.

6. The method according to claim 1, wherein the resin composition comprises 5 to 60 parts by mass of silica as the inorganic filler with respect to 100 parts by mass of the base polymer.

7. The method according to claim 1, wherein the molding material comprises the polyimide resin.

8. The method according to claim 1, wherein the molding material comprises the polyurethane resin.

9. The method according to claim 1, wherein a polyamide resin contains glass filler,
    wherein the ethylene-tetrafluoroethylene copolymer has a melt flow rate at a temperature of 297° C. and a pressure of 49N of not less than 10 gallons per 10 minutes, and
    wherein the ethylene-tetrafluoroethylene copolymer has a melting point of not more than 240° C.

10. The method according to claim 9, wherein the resin composition comprises 10 to 30 parts by mass of calcium carbonate as an inorganic filler with respect to 100 parts by mass of the base polymer.

11. The method according to claim 1, wherein the ethylene-tetrafluoroethylene copolymer includes a third component.

12. A method for producing a molding article, the method comprising:
    preparing a cable comprising an outermost layer disposed on an outer periphery of an insulated wire, the outermost layer comprising a resin composition comprising a Fluorine-containing elastomer,
    wherein the resin composition comprises a tetrafluoroethylene-propylene copolymer and an ethylene-tetrafluoroethylene copolymer as an entire base polymer or a portion of the base polymer at a mass ratio of the tetrafluoroethylene-propylene copolymer to the ethylene-tetrafluoroethylene copolymer in a range of 90:10 to 70:30, and
    wherein the resin composition further comprises 5 to 60 parts by mass of calcium carbonate as an inorganic filler with respect to 100 parts by mass of the base polymer;
    performing an atmospheric-pressure plasma treatment to the outermost layer by using an atmospheric-pressure plasma jet system for a ratio of a C=O bond to a C—C bond (C=O/C—C) on a surface of the outermost layer being not less than 0.5 under a condition that a treatment rate is 0.1 m/min to 5 m/min and a distance from a nozzle hole to the insulated wire is 3 mm to 7 mm; and
    forming a molding material comprising a polyamide resin or a polyurethane resin on an outer periphery of the cable.

13. The method according to claim 12, wherein the ratio of the C=O bond to the C—C bond (C=O/C—C) on the surface of the outermost layer is not less than 0.6.

14. The method according to claim 12, wherein the ratio of the C=O bond to the C—C bond (C=O/C—C) on the surface of the outermost layer is not less than 0.8.

15. The method according to claim 12, wherein the ratio of the C=O bond to the C—C bond (C=O/C—C) on the surface of the outermost layer is not less than 1.0.

16. The method according to claim 12, wherein the resin composition comprises 5 to 60 parts by mass of the calcium carbonate and silica as the inorganic filler with respect to 100 parts by mass of the base polymer.

17. The method according to claim 12, wherein the resin composition comprises 5 to 60 parts by mass of silica as the inorganic filler with respect to 100 parts by mass of the base polymer.

18. The method according to claim 12, wherein the molding material comprises the polyamide resin.

19. The method according to claim 12, wherein the molding material comprises the polyurethane resin.

20. The method according to claim 12, wherein a polyamide resin contains glass filler,
   wherein the ethylene-tetrafluoroethylene copolymer has a melt flow rate at a temperature of 297° C. and a pressure of 49N of not less than 10 gallons per 10 minutes, and
   wherein the ethylene-tetrafluoroethylene copolymer has a melting point of not more than 240° C.

* * * * *